(12) United States Patent  (10) Patent No.: US 8,619,529 B1
Liew et al.  (45) Date of Patent: Dec. 31, 2013

(54) METHODS AND DEVICES FOR ENHANCED ADAPTIVE MARGINING BASED ON CHANNEL THRESHOLD MEASURE

(75) Inventors: San Yuan Liew, Singapore (SG); Suttisak Nilchim, Takuapa (TH); Petrus Hu, Petaling Jaya (MY); Theivarayan Prakash Somasundaram, Kelana Jaya (MY)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 13/427,559

(22) Filed: Mar. 22, 2012

(51) Int. Cl.
 *G11B 20/18* (2006.01)

(52) U.S. Cl.
 USPC ............... 369/53.17; 369/53.12; 369/53.15; 369/53.42

(58) Field of Classification Search
 USPC .......... 369/47.14, 53.12, 53.15, 53.17, 53.42
 See application file for complete search history.

(56) References Cited

U.S. PATENT DOCUMENTS

| | | | |
|---|---|---|---|
| 5,150,050 A | 9/1992 | Genheimer et al. | |
| 5,195,076 A | 3/1993 | Aoki | |
| 5,216,655 A | 6/1993 | Hearn et al. | |
| 5,280,395 A | 1/1994 | Matsuzaki | |
| 5,895,438 A | 4/1999 | Yomtoubian | |
| 6,057,926 A * | 5/2000 | Horai | 356/430 |
| 6,104,556 A | 8/2000 | Schaenzer | |
| 6,151,180 A * | 11/2000 | Bang | 360/53 |
| 6,219,814 B1 | 4/2001 | Coker et al. | |
| 6,223,303 B1 | 4/2001 | Billings et al. | |
| 6,239,931 B1 | 5/2001 | Chung et al. | |
| 6,301,679 B1 | 10/2001 | Tan | |
| 6,366,081 B1 | 4/2002 | Tan et al. | |
| 6,384,999 B1 | 5/2002 | Schibilla | |
| 6,405,342 B1 | 6/2002 | Lee | |
| 6,496,943 B1 | 12/2002 | Belser et al. | |
| 6,504,662 B2 | 1/2003 | Sobey | |
| 6,606,211 B1 | 8/2003 | Lim et al. | |
| 6,654,904 B1 | 11/2003 | Andoh et al. | |
| 6,691,255 B1 | 2/2004 | Rothberg et al. | |
| 6,704,153 B1 | 3/2004 | Rothberg et al. | |
| 6,731,442 B2 | 5/2004 | Jin et al. | |
| 6,850,379 B2 | 2/2005 | Andoh et al. | |
| 6,940,669 B2 | 9/2005 | Schaenzer et al. | |
| 6,947,232 B2 | 9/2005 | Lim et al. | |
| 6,950,967 B1 | 9/2005 | Brunnett et al. | |
| 6,985,319 B2 | 1/2006 | Yip et al. | |
| 7,047,438 B2 * | 5/2006 | Smith et al. | 714/6.13 |
| 7,072,129 B1 | 7/2006 | Cullen et al. | |
| 7,139,145 B2 | 11/2006 | Archibald et al. | |
| 7,215,619 B1 | 5/2007 | Van Den Enden | |
| 7,248,547 B2 * | 7/2007 | Ryu et al. | 369/47.14 |
| 7,389,588 B2 | 6/2008 | Lau | |
| 7,434,019 B2 | 10/2008 | Chia et al. | |
| 7,562,270 B2 | 7/2009 | Andoh | |
| 7,589,926 B2 | 9/2009 | Richmond et al. | |
| 7,626,905 B2 * | 12/2009 | Lai et al. | 369/53.15 |
| 7,656,763 B1 * | 2/2010 | Jin et al. | 369/53.15 |
| 7,839,588 B1 | 11/2010 | Dang et al. | |

(Continued)

*Primary Examiner* — Brenda Bernardi

(57) ABSTRACT

A disk drive configured to enable media defect margining during disk testing may comprise a disk comprising a plurality of tracks; a head actuated over the disk; and a processor operable to test media of the disk drive to detect a media defect; estimate a depth of the detected media defect; determine a margining amount based on at least the estimated depth of the detected media defect, and apply the determined margining amount to the detected media defect.

31 Claims, 6 Drawing Sheets

(56) References Cited

U.S. PATENT DOCUMENTS

| | | | |
|---|---|---|---|
| 7,957,241 B2 * | 6/2011 | Vaes | 369/53.15 |
| 8,014,094 B1 | 9/2011 | Jin | |
| 8,023,215 B1 | 9/2011 | Ghaly et al. | |
| 8,493,681 B1 | 7/2013 | Selvaraj | |
| 2001/0046196 A1 | 11/2001 | McKernan | |
| 2001/0055172 A1 | 12/2001 | Yip et al. | |
| 2002/0048112 A1 | 4/2002 | Chu et al. | |
| 2002/0191319 A1 | 12/2002 | Liew et al. | |
| 2004/0100715 A1 | 5/2004 | Smith et al. | |
| 2004/0153949 A1 | 8/2004 | Ro et al. | |
| 2004/0233805 A1 * | 11/2004 | Yoshida et al. | 369/47.14 |
| 2005/0138464 A1 | 6/2005 | Chong et al. | |
| 2005/0180282 A1 | 8/2005 | Ouyang et al. | |
| 2006/0056088 A1 | 3/2006 | Kudoh et al. | |
| 2006/0126204 A1 | 6/2006 | Taniguchi et al. | |
| 2007/0089031 A1 | 4/2007 | Huffman et al. | |
| 2007/0183074 A1 | 8/2007 | Smith | |
| 2007/0279788 A1 | 12/2007 | Andersen et al. | |
| 2008/0239548 A1 * | 10/2008 | Paul et al. | 360/75 |
| 2009/0034109 A1 | 2/2009 | Paul et al. | |
| 2009/0290463 A1 * | 11/2009 | Kuze et al. | 369/53.17 |
| 2010/0091629 A1 * | 4/2010 | Tan et al. | 369/53.44 |
| 2010/0177428 A1 * | 7/2010 | Oberg | 360/69 |
| 2011/0158073 A1 * | 6/2011 | Ishihara et al. | 369/53.41 |

\* cited by examiner

US 8,619,529 B1

METHODS AND DEVICES FOR ENHANCED ADAPTIVE MARGINING BASED ON CHANNEL THRESHOLD MEASURE

BACKGROUND

In disk drives, defects on the media surface can cause the read channel to repeatedly detect incorrect data (hard errors). Very large defects may result in hard errors that are too long for the disk drive ECC algorithm to detect. Defect scans are used in the manufacturing process to flag those sectors with large defects so they are excluded from use during normal drive operation. The defect scan involves two main steps:

1. Write entire media surface with a high frequency repeating patterns;
2. Read back each sector and check for unusual changes in head signal amplitude.

A high frequency pattern is written to maximize the probability of is actually writing a transition on a small defect. The highest frequency pattern a read channel can usually write is a 2T preamble (transitions are spaced $2 \times T_{TBG}$ apart). If a transition is written on a defect, the resulting magnetic head amplitude increases or decreases based on the type of defect. A decrease in magnetic material on the media correspondingly decreases the amplitude of the read back signal (resulting in a localized read back signal drop-out) and an increase in magnetic material on the media correspondingly increases the amplitude of the read back signal (resulting in a localized read back signal drop-in).

Based upon the number of detected defects, it may be determined whether the disk drive is useable or not. The disk drive may fail the manufacturing process when too many defects are detected. Conventionally, if the disk drive is determined to be usable given the number and severity of the detected defects, a predetermined space around the detected defect is designated as a margin that becomes unavailable for user data. However, experience has shown that a detected defect may spread or "grow" from its original position during subsequent use of the disk drive. Such defects are commonly known as "grown defects" and often manifest themselves outside of the predetermined margins designated around the detected media defect. In some cases, the disk drive may ultimately fail in the hands of the end user, due to such grown defects. To provide increased drive reliability, there is a need in the disk drive manufacturing process to enable better defect margining around detected media defects.

DETAILED DESCRIPTION

Figure 1:
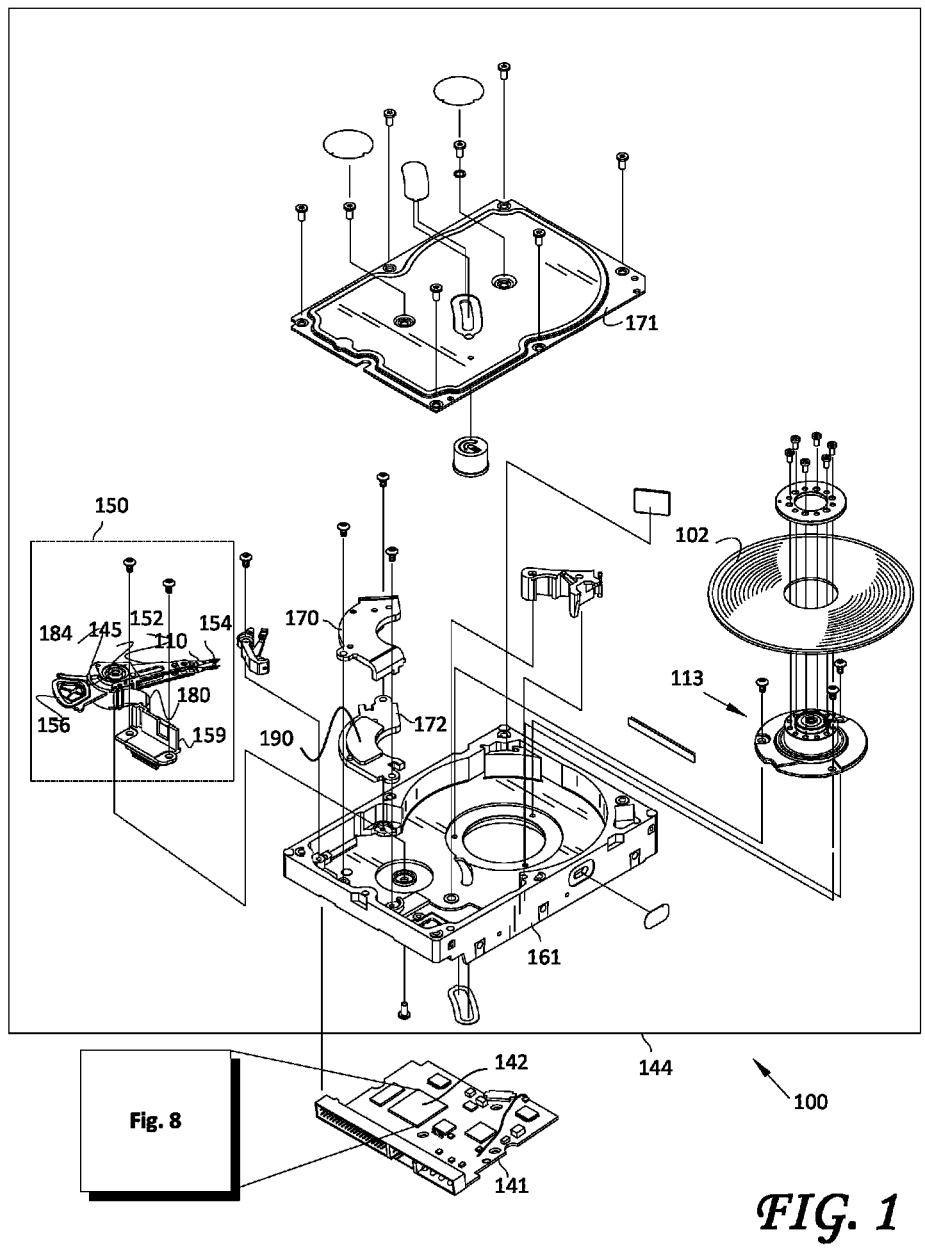
FIG. 1 shows major components of a disk drive, according to one embodiment.

FIG. 1 shows the principal components of an exemplary magnetic disk drive 100 constructed in accordance with one embodiment. With reference to FIG. 1, the disk drive 100 comprises a head disk assembly (HDA) 144 and a printed circuit board assembly (PCBA) 141. The HDA 144 includes a base 161 and a cover 171 attached to the base 161 that collectively house a disk 102 or a stack of two or more such disks 102 configured for improved margining of detected media defects, according to one embodiment. The HDA 144 also includes a spindle motor 113 attached to the base 161 for rotating the disk 102, an HSA 150, and a pivot bearing cartridge 184 (such as a stainless steel pivot bearing cartridge, for example) that rotatably supports the head stack assembly (HSA) 150 on the base 161. The spindle motor 113 rotates the disk 102 at a constant angular velocity. The HSA 150 comprises a swing-type or rotary actuator assembly 152, at least one head gimbal assembly (HGA) 110 coupled to the load beam 303 that includes a flexure constructed as described above, and a flex circuit cable assembly. The rotary actuator assembly 152 includes a body portion, at least one actuator arm cantilevered from the body portion, and a coil portion 156 cantilevered from the body portion in an opposite direction from the actuator arm. The actuator arm supports the HGA 110 that, in turn, includes and supports the slider(s). The flex circuit cable assembly may include the flexible cable 180 and a flex clamp 159. The flexible cable 180 and the flexure of the HGA 110 are structured and coupled in the manner described above. The HSA 150 is pivotally secured to the base 161 via the pivot-bearing cartridge 184 so that the slider at the distal end of the HGA 110 may be moved over the surfaces of the disk(s) 102. The pivot-bearing cartridge 184 enables the HSA 150 to pivot about a pivot axis. The storage capacity of the HDA 144 may be increased by, for example, increasing the track density (the TPI) on the disk 102 and/or by including additional disks 102 in a disk stack and by an HSA 150 having a vertical stack of HGAs 110 supported by a rotary actuator assembly 152 having multiple actuator arms. The "rotary" or "swing-type" actuator assembly 152 rotates on the pivot bearing 184 cartridge about its pivot axis between limited positions and further includes a coil portion 156 that extends from one side of the body portion to interact with one or more permanent magnets 190 mounted to back irons 170, 172 to form a voice coil motor (VCM). The VCM causes the HSA 150 to pivot about the actuator pivot axis to cause the slider and the read-write transducers thereof to sweep radially over the disk(s) 102. The PCBA 141 includes a processor 142 and control circuitry configured to read data from and write data to the disk(s) 102 and to carry out the methods and margining functionality described and shown herein.

Figure 8:
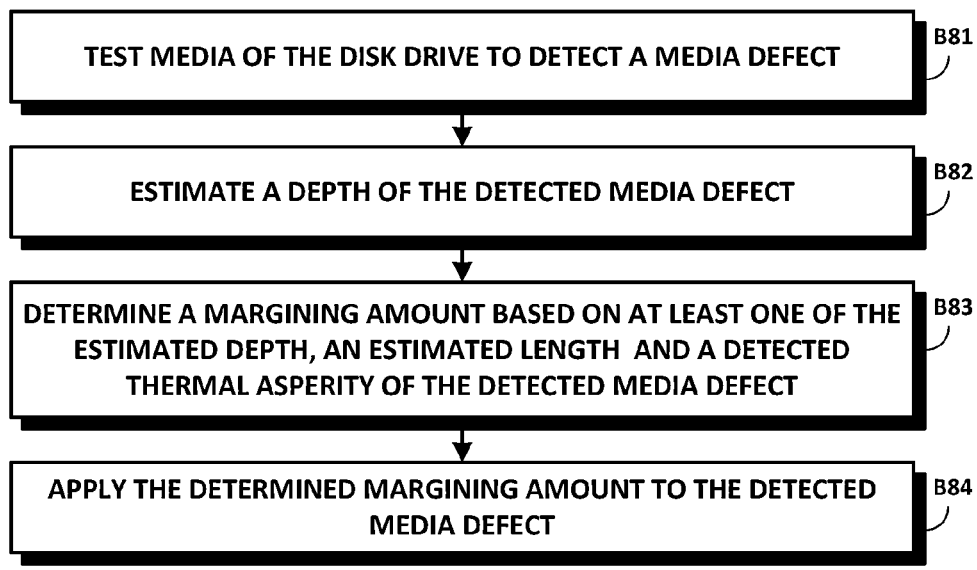
FIG. 8 is a flowchart of a method to enable defect margining during testing of a disk drive, according to one embodiment.

One embodiment is a disk drive, such as shown in FIG. 1, configured to enable media defect margining. The disk may comprise a disk 102 comprising a plurality of tracks and a head actuated over the disk 102. A processor, such as shown at 142, may be configured to determine the amount of margining to apply to a detected media defect by testing the media of the disk drive to detect one or more such media defects. According to one embodiment, the processor 142 may be configured to carry out the method of enabling defect margining during testing of a disk drive, as shown in FIG. 8.

The detected defect may be a micro defect, a large defect, a shallow defect or a thermal asperity (TA), for example. TAs are tribological events characterized by a transient read signal spike that may cause giant magnetoresistance (GMR) and MR heads of disk drives to temporarily malfunction, resulting in a temporary disruption in the recovery of data. Indeed, TAs may be caused by sensor temperature rise due to frictional contact with disk asperities or contaminant particles. After a media defect is detected, the depth of the detected media defect may be estimated, and the margining amount may be determined, based at least on the estimated depth of the is detected media defect. According to one embodiment, the margining amount may comprise a number of contiguous cylinders to add as a margin to the inner diameter (ID) and/or outer diameter (OD) ends of the detected media defect that will be unavailable for storing user data. Lastly, the processor 142 may be configured to apply the determined margining amount to the detected media defect.

Figure 2:
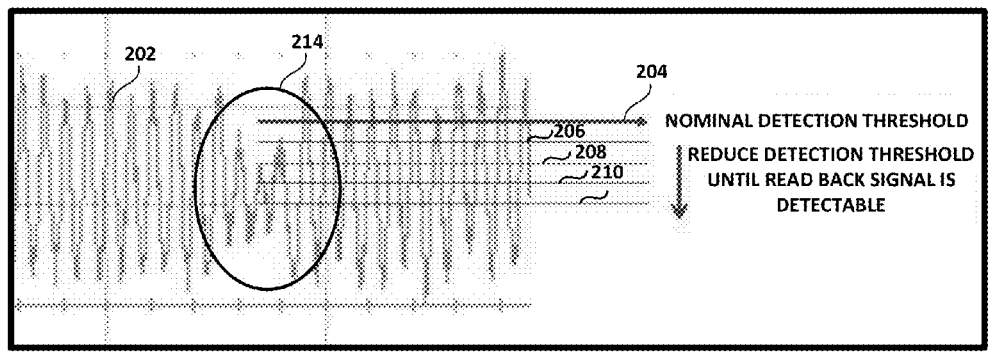
FIG. 2 shows a read-back signal and a method of estimating a depth of a detected media defect, according to one embodiment.

According to one embodiment, the depth of the detected media defect may be determined using a drop-out register, as shown in FIG. 2. Indeed, FIG. 2 shows a read-back signal and a method of estimating a depth of a detected media defect, according to one embodiment. As shown therein, the amplitude of the read-back signal 202 locally decreases at 214, which may be indicative of a localized decrease in magnetic material on the media, most likely due to a defect (e.g., a scratch) in one or more of the magnetic layers on the disk 102. The drop-out register, according to one embodiment, may be a seven bit register, meaning that a Digital-to-Analog (DAC) count that may be programmed into this register may range from 0 to a count of 127, corresponding to a granularity of 127 different detectable amplitudes for the read-back signal 202. By gradually decreasing the DAC count in the drop-out register, detection sensitivity may be correspondingly reduced. By reducing the DAC count, thereby reducing magnitude of the detection threshold of the read-back signal, the amplitude of the read-back signal at the detected defect may be characterized, $1/127^{th}$ increments of the nominal value of the read-back signal, in the case of a 7-bit drop-out register.

As shown in the example of FIG. 2, at the nominal threshold 204, no read back signal 202, is detected. This means that the amplitude of the read-back signal 202, at the detected media defect, is lower than the nominal amplitude indicated at 204. The DAC count of the drop-out register may then be iteratively decreased to a next lowest threshold, as shown at 206. As no read back signal 202 is detected (at the location of the detected media defect) having an amplitude at least as great as the reduced threshold 206, it may be deduced therefrom that the detected media defect is deeper still. As shown at 208, the detection threshold may then be lowered again. As shown, the read-back signal 202 is still undetectable at the detection threshold 208. In the exemplary case shown in FIG. 2, it is only when the DAC count of the drop-out is register is reduced, thereby lowering the detection threshold to 210 that the read-back signal 202 is detected. As the depth of the detected media defect is generally proportional to the magnitude of the read-back signal 202, by reading the drop-out register when the read-back signal 202 is detected at the detected media defect, a quantitative measure of the depth of the detected media defect may be characterized (as a percentage of nominal, for example) and/or numerically estimated as the DAC count where detection of the read-back signal 202 was re-established at a given detection threshold.

Figure 3:
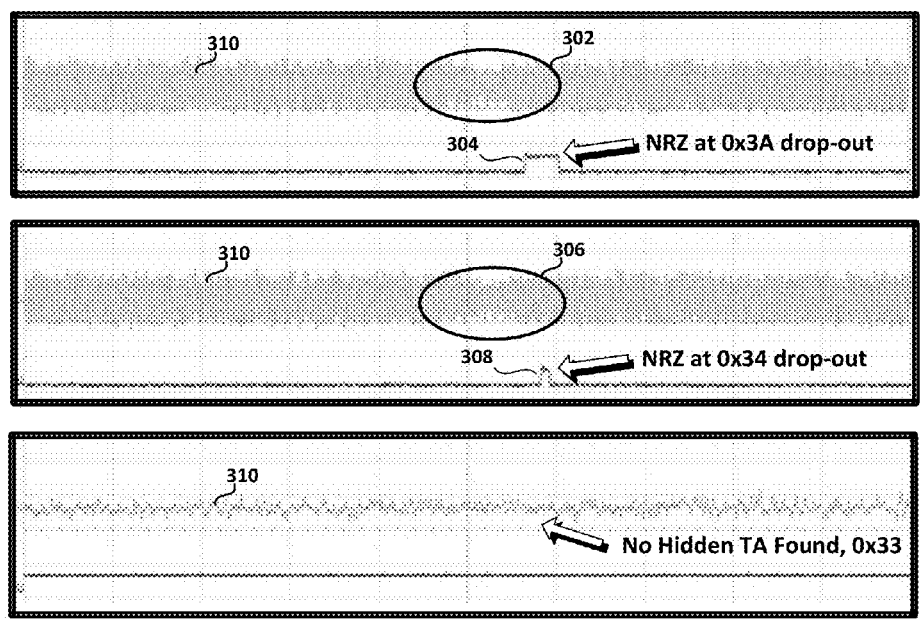
FIG. 3 shows the characterization of a detected shallow media defect, according to one embodiment.

FIG. 3 shows the characterization of a shallow detected media defect, according to one embodiment. As shown in FIG. 3, the read-back signal 310 shows a drop-out at 302, 306 indicative of a defect in the media under the read head. In this example, the nominal threshold, as indicated by the drop-out register, is 0x3Ah. According to one embodiment, a signal on a Non-Return-To-Zero (NRZ) bus may be asserted as shown at 304 when the magnitude of the read-back signal 310 drops below the nominal threshold. As indicated by the NRZ bus at 308, the defect appears to be barely detectable when the threshold (and hence the DAC count of the drop-out register) is reduced to 0x34h and is undetectable when the detection threshold is reduced to 0x33h. Therefore, the defect in the media evidenced by the read-back signal 310 at 302, 306 may be characterized as having a relatively shallow depth of about 10% (($1-52_d/58_d)\times100$) of the maximum DAC count.

Figure 4:
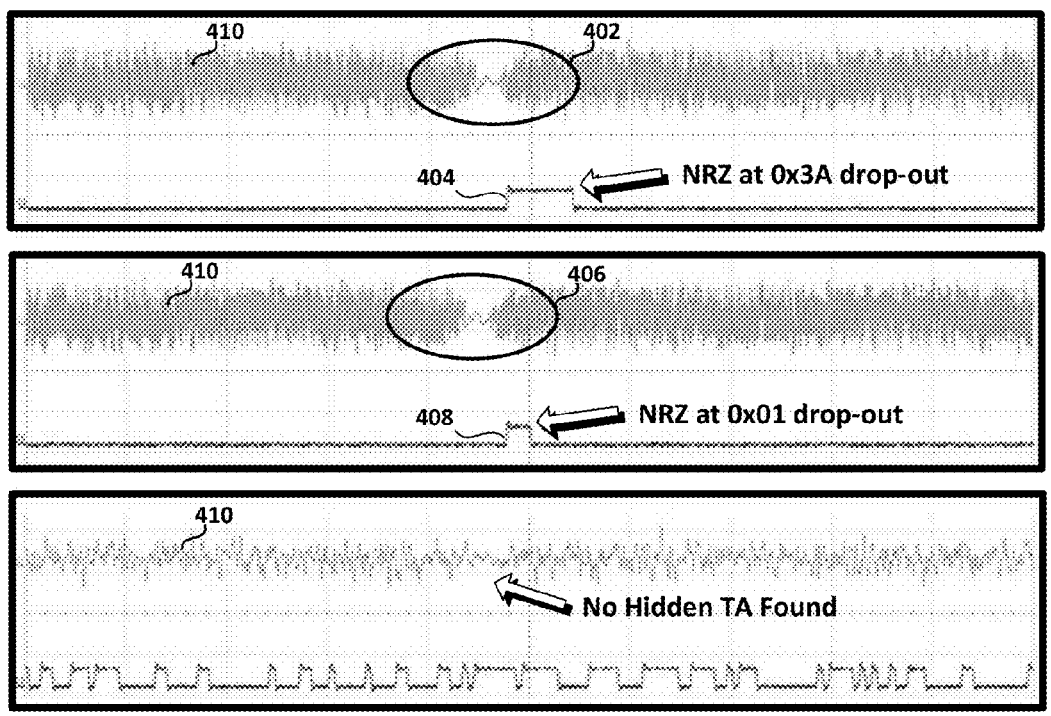
FIG. 4 shows the characterization of a detected deep media defect, according to one embodiment.

FIG. 4 shows the characterization of a detected deep media defect, according to one embodiment. As shown in FIG. 4, the read-back signal 410 shows a drop-out at 402, 406 indicative of a defect in the media under the read head. In this example, the nominal threshold, as indicated by the drop-out register, is also 0x3Ah. As shown, a signal on the NRZ bus is asserted at 404 at nominal threshold 0x03Ah, indicative of a drop-out of the read-back signal under the read head. As indicated by the assertion of the signal on the NRZ bus at 408, the defect appears to be persistent even when the threshold (and hence the DAC count of the drop-out register) is reduced to 0x01 h, the lowest available detection threshold. Therefore, the defect in the media evidenced by the read-back signal 410 at the location indicated at 402, 406 may be characterized as having a depth of 100% of the maximum DAC count.

According to one embodiment, the margining to be applied to a detected media defect may be based upon the estimated depth of the detected media defect. Deeper defects may be allocated a greater margining amount (e.g., a greater number of tracks or cylinders) than comparatively shallower detected media defects, for example. According to one embodiment, the amount of margining to apply to a detected media defect may be based not only on the estimated depth of the media defect, but may also be based on the length of the detected media defect. According to one embodiment, the amount of margining to apply to a detected media defect may be based not only on the estimated depth of the media defect and the length of the detected media defect, but also on the presence of a TA.

Indeed, an amount of margining to apply to a detected media defect may, according to one embodiment, be based on a formula that utilizes a margining length amount based on the length of the detected media defect, an extra depth margining amount based upon the estimated depth of the detected media defect and an extra TA margining amount based on the presence of a TA on the media in the vicinity of the detected media defect. According to one embodiment, the margining length amount may be calculated as

[length of detected media defect/2]+1.

The length of the detected media defect may be calculated by subtracting the highest track number in which the media defect is present from the lowest track number in which the same media defect is present. The extra depth margining amount, according to one embodiment, may be quantified by a ratio interrelating the estimated depth and the margining length amount. One embodiment defines the extra depth margining amount as

[(estimated depth of media defect×margining length amount)/(estimated depth of media defect+margining length amount)].

According to one embodiment, the portion of the amount of margining to apply to a detected media defect attributable to a detected thermal asperity (the extra TA margining amount) may be related to the margining length amount. According to one embodiment, the extra TA margining amount may be a product of a scaling factor and the margining length amount. The scaling factor may be selected, for example, to be is less than unity. For example, the scaling factor may be selected to be less than 0.5. According to one embodiment, the scaling factor may be selected to be less than 0.3. For example, the scaling factor may be selected to be 0.15.

According to one embodiment, the margining amount to be applied to the detected media defect may be calculated as the sum of the extra depth margining amount and the extra TA margining amount. Applying a customized margining amount to a detected media defect that takes in to account the length of the detected media defect, the estimated depth of the detected media account and the presence of a TA results in margining that is customized to the morphology of individual detected media defects. Such customized margining amounts, moreover, are more likely to encompass locations near the detected media defect where grown defects are most likely to appear, particularly after the drive is shipped and put into use by the end user.

Figure 5:
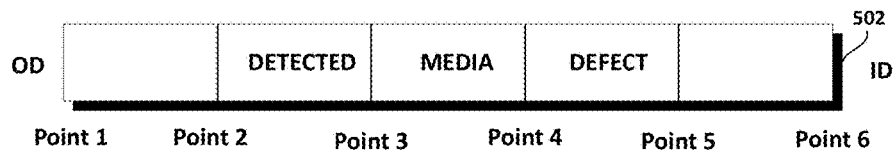
FIG. 5 shows aspects of a method for estimating the depth of a detected media defect and the location of the greatest local depth, according to one embodiment.

FIG. 5 shows aspects of a method for estimating the depth of a detected media defect 502 and the location of the greatest local depth, according to one embodiment. The processor 142 of the disk drive may be further configured to select a predetermined number of reference points on the detected media defect 502. According to one embodiment, the predetermined number of reference points may be disposed equidistantly across the detected media defect, for example from the OD end to the ID end of the detected media defect. According to one embodiment, six such predetermined points may be selected and a local depth of the detected media defect 502 may be estimated at each of the predetermined reference points, using the drop-out register described above, for example. In other embodiments, a different number of reference points may be used. By determining at which of the selected reference points the greatest depth of the detected media defect is located, the margining amount applied to a first end (e.g., an ID end) and/or to a second (e.g., an OD end) of the detected media defect may be varied based on the estimated local depth of the detected media defect at each of the predetermined number of reference points. For example, if the detected media defect is deepest closest to reference points 1 and 2 (which are closer to the OD than reference points 3, 4, 5, and 6), then extra margining may be applied to the OD end of the detected media defect, as compared with the ID end thereof. Alternately, if the depth of the detected media defect was found to be the is greatest at point 3, then extra margining may be applied to both the OD and the ID ends, according to one embodiment. Similarly, if the depth of the detected media defect was found to be the greatest at points 5 and 6, then extra margining may be applied to the ID end, according to one embodiment.

According to one embodiment, the estimation of the local depths at each of the predetermined number of reference points of the detected media defect described above may also enable a prediction of where a grown defect is most likely to appear. Indeed, if the detected media defect is deepest closest to reference points 1 and 2 (which are closer to the OD than reference points 3, 4, 5 and 6), then it is likely that a grown defect, should it appear close to the detected media defect, will appear at the OD end of the media defect. According to one embodiment, the amount of extra margining applied to the OD end of the detected media defect in this example, may be sufficient to encompass the location of the grown defect, should one appear. In this manner, as the grown defect is likely to appear in an area of the media already designated as a margin for a detected media defect, the appearance of the grown defect should not affect user data, as no user data is permitted within the tracks designated as belonging to the margining areas around detected media defects.

Figure 6:
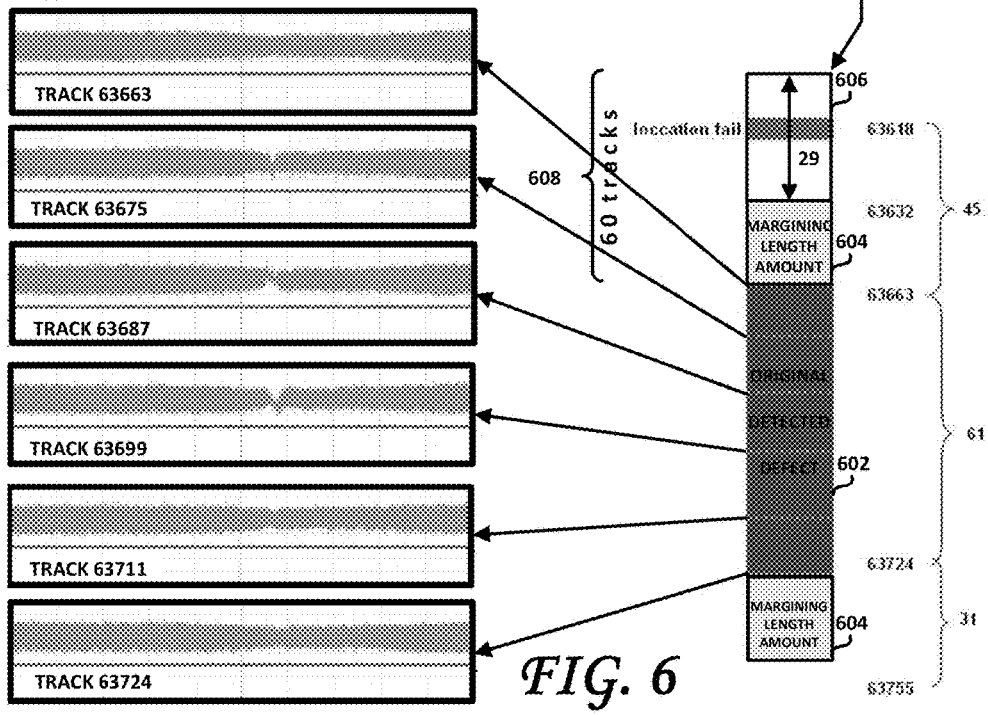
FIG. 6 shows an example of a determination of a margining amount for a detected media defect, according to one embodiment.

FIG. 6 shows an example of a determination of a margining amount for a detected media defect, according to one embodiment. As shown in FIG. 6, the detected media defect 602 was determined to run from track 63724 to 63663, or a media defect length of about 61 tracks. Using the formula above, the margining length amount is (61/2)+1 or about 31 tracks in length. This margining length amount may be added to the terminal ends of the detected media defect 602. That is, 31 tracks of margining 604 may be added on one end of the detected media defect, from track 63724 to 63755 and one the other end of the detected media defect, from track 63663 to 63632, as shown in FIG. 6, based solely on the determined length of the detected media defect. As also shown in FIG. 6, a TA was also detected. According to one embodiment and based on a scaling factor of 0.15, the extra TA margining amount may be calculated as 0.15×31 (the margining length) or about 5 tracks.

According to one embodiment, the extra margining attributable to the estimated depth of the detected media defect may be determined as follows. As is shown in FIG. 6, tracks 63699, 63687 and 63675, based on the amplitude of the read-back signals, exhibit the greatest signal drop-out, at positions corresponding to reference points (see FIG. 5) 4, 3 and 2, respectively. As the greatest depth of the detected media defect occur closer to the OD of the detected media defect, a prediction may be made that a grown defect, should it subsequently appear, is more likely to appear at or near the OD end of the detected media defect, if at all.

The extra depth margining amount 606 may be calculated, in this instance, as a function of at least the maximum estimated depth of the detected media defect. In this example, the maximum depth, as determined from the drop-out register, is at 127, indicating the maximum depth measurable. The extra depth margining amount, according to one embodiment, may be calculated as [(estimated depth of media defect×margining length amount)/(estimated depth of media defect+margining length amount)] or [(127×31)/(127+31)] or about 24 tracks of extra depth margining. Finally, the extra margining amount 606 to be applied at least to the OD end of the detected media defect may, according to one embodiment, be the sum of the extra TA margining amount and the extra depth margining amount, or 5+24 or 29. This extra margining amount 606 of 29 tracks may be applied to the OD end of the detected media defect. As shown, the extra margining amount 606 of 29 tracks or cylinders covers and extends beyond the subsequently detected grown defect at track 63618. As the storage of user data would have been disallowed within the span of the extra margining amount of 29 tracks, such grown defect would not have affected user data and may have prevented the drive from being returned. According to one embodiment, the calculated extra margining amount 606 may be added to both the OD and the ID end of the detected media defect. According to one embodiment, less than the full extra margining amount may be applied to the OD and/or ID end of the detected media defect. For example, and as shown in FIG. 6, the extra margining amount 606 may be added to only one end of the detected media defect.

According to one embodiment, the total amount of margining applied to the detected media defect is the sum of the margining length amount 604 (the margining that is only based on the length of the detected media defect) and the extra margining amount 606 that is based at least on the estimated depth of the detected is media defect. According to one embodiment and as shown at FIG. 6, the extra margining amount 606 may be based on the estimated depth of the detected media defect and on the presence of a TA. In the example developed in FIG. 6, the total amount of margining applied to the OD end of the detected media defect is, therefore, 31+29 or 60 tracks, as shown at reference 608 in FIG. 6. This total amount of margining applied to the OD end of the detected media defect encompasses the "location fail" at track 63618. As noted above, this track was the location at which a grown defect was detected. By applying the 60 tracks of margining onto the OD side, starting at track 63632, a grown defect may subsequently manifest itself anywhere within the 60 tracks of margining without compromising drive operations.

Figure 7:
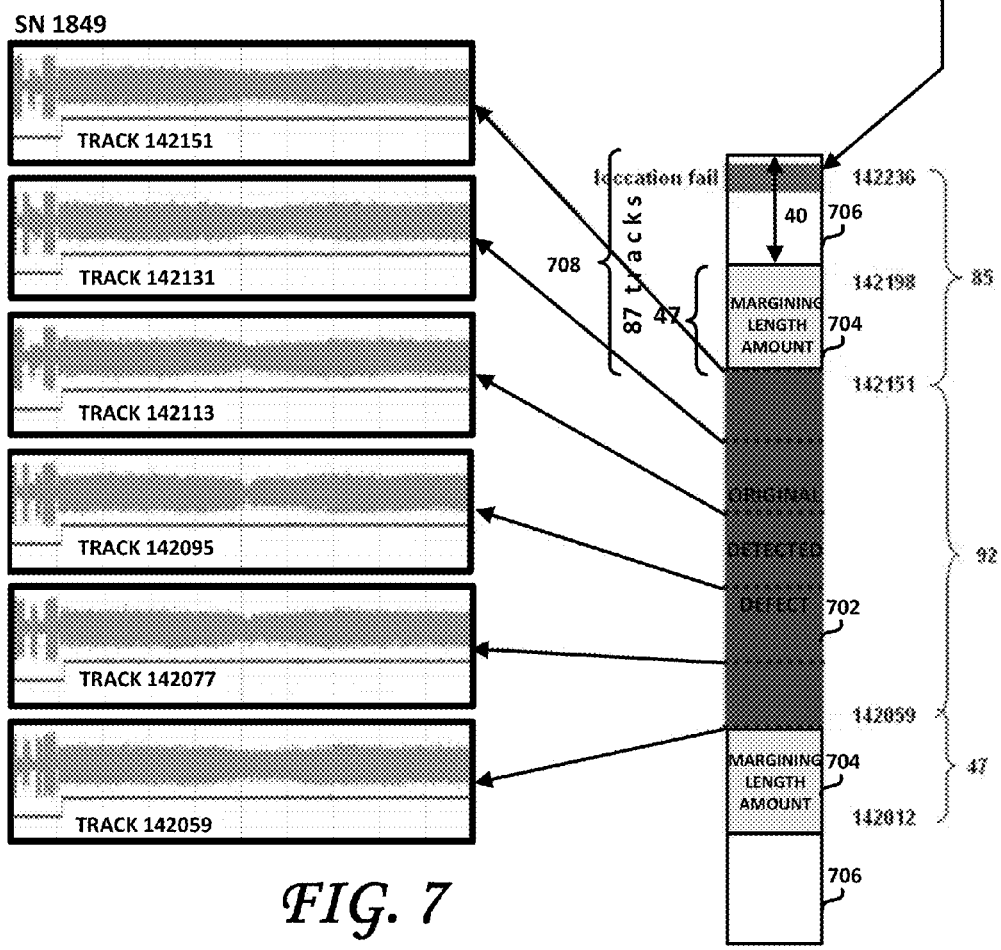
FIG. 7 shows another example of a determination of a margining amount for a detected media defect, according to one embodiment.

FIG. 7 shows an example of a determination of a margining amount for a detected media defect, according to one embodiment. As shown in FIG. 7, the detected media defect 702 was determined to run from track 142059 to 142151 or a media defect length of 92 tracks. Using the formula above, the margining length amount 704 is (92/2)+1 or about 47 tracks in length. This margining length amount 704 may be added to the terminal ends of the detected media defect. That is, 47 tracks of margining may be added on one end of the detected media defect, from track 142059 to 142012 and one the other end of the detected media defect, from track 142151 to 142198, as shown in FIG. 7, based solely on the determined length of the detected media defect. As also shown in FIG. 7, a TA was also detected. According to one embodiment and based on a scaling factor of 0.15, the extra TA margining amount may be calculated as 0.15×47 (the margining length) or about 7 tracks.

According to one embodiment, the extra margining attributable to the estimated depth of the detected media defect may be determined as follows. As shown in FIG. 7, track 142095, based on the amplitude of the read-back signals, exhibit the greatest signal drop-out, at positions corresponding to reference point 4 (see FIG. 5). Based on this scenario, there is a possibility of grown defects appearing both at the ID and OD of the detected media defect.

The extra depth margining amount may be calculated, in this instance, as a function of at least the maximum estimated depth of the detected media defect. In this example, the maximum depth, as determined from the drop-out register, is at 127, indicating the maximum depth measurable. The extra depth margining amount, according to one embodiment, may be calculated as [(estimated depth of media defect×margining length amount)/(estimated depth of media defect+margining length amount)] or [(127×47)/(127+47)] or about 33 tracks. Finally, the extra margining amount 706 to be applied at least to the OD end of the detected media defect may, according to one embodiment, be the sum of the extra TA margining amount and the extra depth margining amount, or 7+33 or 40. This extra margining amount 706 of 40 tracks may be applied to the OD end of the detected media defect and to the ID end of the detected media defect. As shown, the extra margining amount 702 of 40 tracks or cylinders covers and extends beyond the subsequently detected grown defect at track 142236. As the storage of user data would have been disallowed within the span of the extra margining amount 706 of 40 tracks, such grown defect would not have affected user data and may have prevented the drive from being returned. The same result would have obtained had a grown defect appeared within the span of the extra margining amount 706 applied to the other end of the detected media defect 702. According to one embodiment, the calculated extra margining amount 702 may be added to both the OD and the ID end of the detected media defect. According to one embodiment, less than the full extra margining amount may be applied to the OD and/or ID end of the detected media defect.

According to one embodiment, the total amount of margining applied to the detected media defect is the sum of the margining length amount (the margining that is only based on the length of the detected media defect) and the extra margining amount 702 that is based at least on the estimated depth of the detected media defect. According to one embodiment and as shown at FIG. 7, the extra margining amount 702 is based on the estimated depth of the detected media defect and on the presence of a TA. In the example developed in FIG. 7, the total amount of margining applied to the each of the ends of the detected media defect is 47+40 or 87 tracks, as shown at 708. This total amount of margining applied to the OD end and the ID end of the detected media defect encompasses the "location fail" at track 142236. As noted above, this track was the location at which a grown defect was detected. By applying the 87 tracks of margining onto both the OD and the ID sides, a grown defect is may subsequently manifest itself anywhere within the 87 tracks of margining at either the OD or ID end without compromising drive operations.

FIG. 8 is a flowchart of a method to enable defect margining during testing of a disk drive, according to one embodiment. According to one embodiment, the processor 142 may be configured to carry out the method shown in FIG. 8. As shown therein, Block B81 calls for testing media of the disk drive to detect a media defect. Thereafter, as shown at Block B82, a depth of the media defect detected may then be estimated. A margining amount may then be determined, as called for by Block B83, which margining amount may be based on one or more of the following: the estimated depth of the detected media defect, the estimated length thereof and/or a detected thermal asperity of the detected media defect. Lastly, Block B84 calls for applying the margining amount determined in Block B83 to the detected media defect.

While certain embodiments of the inventions have been described, these embodiments have been presented by way of example only, and are not intended to limit the scope of the inventions. Indeed, the novel methods, devices and systems described herein may be embodied in a variety of other forms. Furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions. For example, those skilled in the art will appreciate that the margining amounts may be based on other characteristics of the detected media defect as well. Depending on the embodiment, certain of the steps described in the example above may be removed, others may be added. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

The invention claimed is:

1. A disk drive to enable defect margining during disk testing, comprising:
a processor operable to:
test media of the disk drive to detect a media defect;
estimate a depth of the detected media defect;
determine a margining amount based on at least the estimated depth of the detected media defect; and apply the determined margining amount to the detected media defect.

2. The disk drive of claim 1, wherein the margining amount is further based on a length of the detected media defect.

3. The disk drive of claim 2, wherein a portion of the determined margining amount attributable to the length of the detected media defect is half of the length of the detected media defect as measured in tracks, plus 1 track.

4. The disk drive of claim 1, wherein the margining amount is further based on a detected presence of a thermal asperity within the detected media defect.

5. The disk drive of claim 4, wherein a portion of the determined margining amount attributable to the detected presence of the thermal asperity is a product of a scaling factor and a length of the detected media defect.

6. The disk drive of claim 1, wherein the processor is further operable to apply at least a portion of the determined margining amount to at least one of an end of the detected media defect directed toward an inner diameter (ID) of the media and to an end of the detected media defect directed toward the outer diameter (OD) of the media.

7. The disk drive of claim 1, wherein the processor is further operable to estimate the depth of the detected media defect by reading back a signal written to the media and reducing a threshold of detection from a nominal threshold until the read back signal is no longer detectable.

8. The disk drive of claim 1, wherein the processor is further operable to determine whether an estimated greatest depth of the detected media defect is toward an inner diameter (ID) of the media or an outer diameter (OD) of the media.

9. The disk drive of claim 8, wherein the processor is further operable to:
apply more of the margining amount at an ID end of the media if the estimated greatest depth of the detected media defect is closer to the ID than the OD of the media; and
apply more of the margining amount at an OD end of the media if the estimated greatest depth of the detected media defect is closer to the OD than the ID of the media.

10. The disk drive of claim 8, wherein the processor is further operable to:
select a predetermined number of reference points on the detected media defect ranging from an OD end to an ID end of the detected media defect;
estimate a local depth of the detected media defect at each of the predetermined number of reference points; and
vary the margining amount applied to at least one of the ID end and the OD end of the detected media defect based on the estimated local depth of the detected media defect at each of the predetermined number of reference points.

11. The disk drive of claim 1, wherein a portion of the determined margining amount attributable to the estimated depth of the detected media defect comprises a calculated ratio of: (1) a product of a length of the detected media defect and the estimated depth to (2) a sum of the length of the detected media defect and the estimated depth.

12. A method to enable defect margining during testing of a disk drive, comprising:
testing media of the disk drive to detect a media defect;
estimating a depth of the detected media defect;
determining a margining amount based on at least estimated depth of the detected media defect; and
applying the determined margining amount to the detected media defect.

13. The method of claim 12, wherein the margining amount is further based on a length of the detected media defect.

14. The method of claim 13, wherein a portion of the determined margining amount attributable to the length of the detected media defect is half of the length of the detected media defect as measured in tracks, plus 1 track.

15. The method of claim 12, wherein the margining amount further based on a detected presence of a thermal asperity within the detected media defect.

16. The method of claim 15, wherein a portion of the determined margining amount attributable to the detected presence of thermal asperity is a product of a scaling factor and a length of the detected media defect.

17. The method of claim 16, wherein applying the determined margining amount comprises applying at least a portion of the determined margining amount to at least one of an end of the detected media defect directed toward an inner diameter (ID) of the media and to an end of the detected media defect directed toward the outer diameter (OD) of the media.

18. The method of claim 12, wherein estimating the depth of the detected media defect comprises reading back a signal written to the media and reducing a threshold of detection from a nominal threshold until the read back signal is no longer detectable.

19. The method of claim 12, further comprising determining whether an estimated greatest depth of the detected media defect is toward an inner diameter (ID) of the media or an outer diameter (OD) of the media.

20. The method of claim 19, further comprising:
applying more of the margining amount at an ID end of the detected media defect if the estimated greatest depth of the detected media defect is closer to the ID than the OD of the media; and
applying more of the margining amount at an OD end of the detected media defect if the estimated greatest depth of the detected media defect is closer to the OD than the ID of the media.

21. The method of claim 19, further comprising:
selecting a predetermined number of reference points on the detected media defect ranging from an OD end to an ID end of the detected media defect;
estimating a local depth of the detected media defect at each of the predetermined number of reference points; and
varying the margining amount applied to at least one of the ID end and the OD end of the detected media defect based on the estimated local depth of the detected media defect at each of the predetermined number of reference points.

22. The method of claim 12, wherein determining the margining amount comprises at least calculating a ratio of (1) a product of a length of the detected media defect and the estimated depth to (2) a sum of the length of the detected media defect and the estimated depth.

23. A method to enable defect margining during testing of a disk drive, comprising:
testing media of the disk drive to detect a media defect;
estimating a depth of the detected media defect;
determining a margining amount based on at least one of the estimated depth, an estimated length, and a detected thermal asperity of the detected media defect, and
applying the determined margining amount to the detected media defect.

24. The method of claim 23, wherein the margining amount is determined based at least on the estimated length of the detected media defect and wherein a portion of the determined margining amount attributable to the estimated length of the detected media defect is half of the estimated length of the detected media defect as measured in tracks, plus 1 track.

25. The method of claim 23, wherein the margining amount is determined based at least on the detected thermal asperity and the estimated length of the detected media defect and wherein a portion of the determined margining amount attributable to the detected thermal asperity is a product of a scaling factor and the estimated length of the detected media defect.

26. The method of claim 23, wherein applying the determined margining amount comprises applying at least a portion of the determined margining amount to at least one of an end of the detected media defect directed toward an inner diameter (ID) of the media and to an end of the detected media defect directed toward the outer diameter (OD) of the media.

27. The method of claim 23, wherein estimating the depth of the detected media defect comprises reading back a signal written to the media and reducing a threshold of detection from a nominal threshold until the read back signal is no longer detectable.

28. The method of claim 23, further comprising determining whether an estimated greatest depth of the detected media defect is toward an inner diameter (ID) of the media or an outer diameter (OD) of the media.

29. The method of claim 28, further comprising:

applying more of the margining amount at an ID end of the detected media defect if the estimated greatest depth of the detected media defect is closer to the ID than the OD of the media; and applying more of the margining amount at an OD end of the detected media defect if the estimated greatest depth of the detected media defect is closer to the OD than the ID of the media.

30. The method of claim 28, further comprising:

selecting a predetermined number of reference points on the detected media defect ranging from an OD end to an ID end of the detected media defect:

estimating a local depth of the detected media defect at each of the predetermined number of reference points; and varying the margining amount applied to at least one of the ID end and the OD end of the detected media defect based on the estimated local depth of the detected media defect at each of the predetermined number of reference points.

31. The method of claim 28, wherein determining the margining amount comprises at least calculating a ratio of: (1) a product of a length of the detected media defect and the estimated depth to (2) a sum of the length of the detected media defect and the estimated depth.

\* \* \* \* \*